April 29, 1969  R. H. KRESS  3,441,102
LOAD TRANSFERRING SYSTEM FOR MULTI-AXLE VEHICLES
Filed Oct. 26, 1966
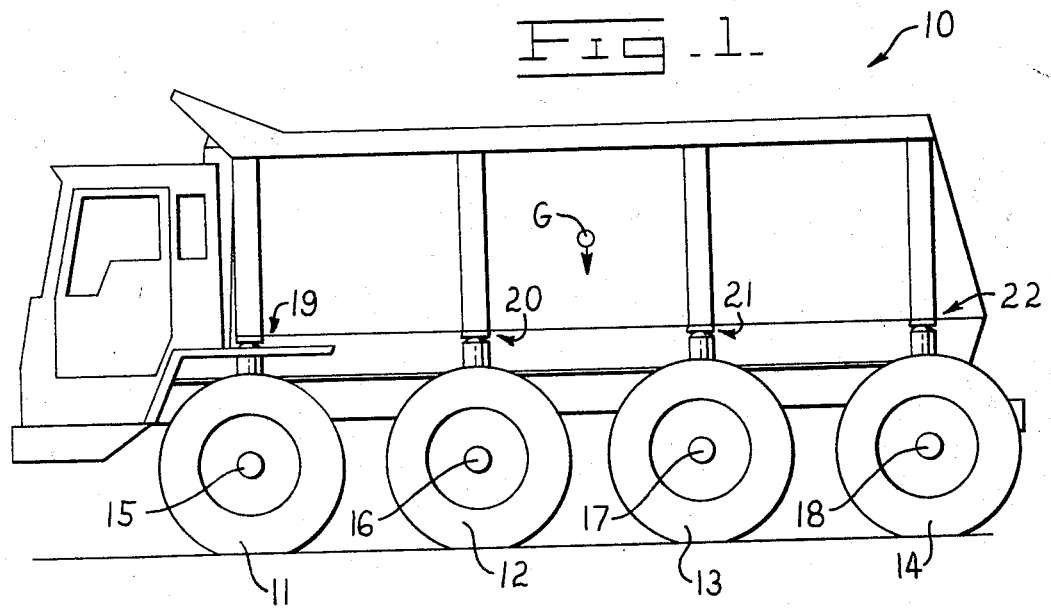
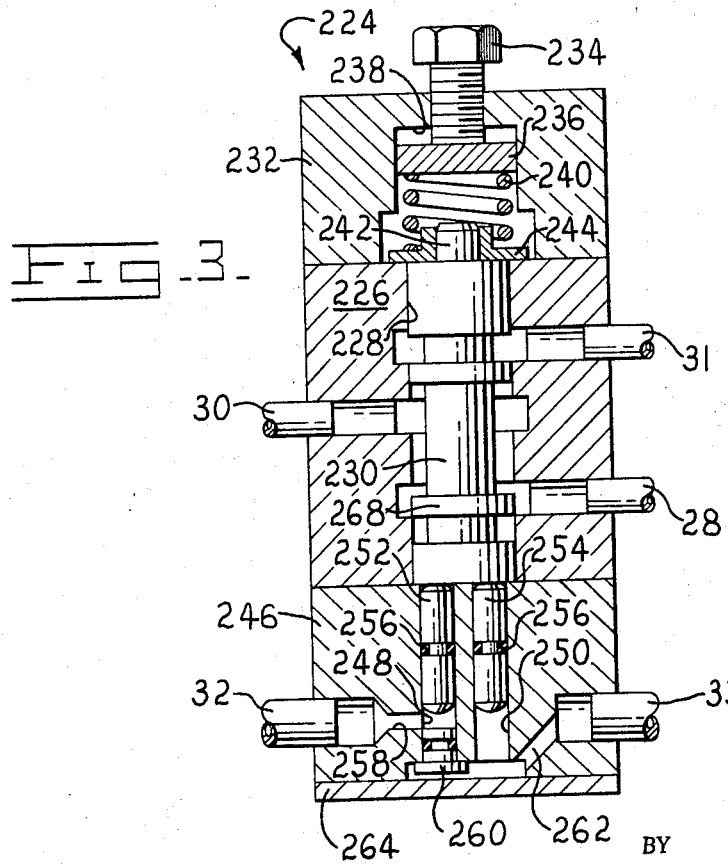
INVENTOR.
RALPH H. KRESS
BY
*Myer, Tjensvold, Feix & Phillips*
ATTORNEYS

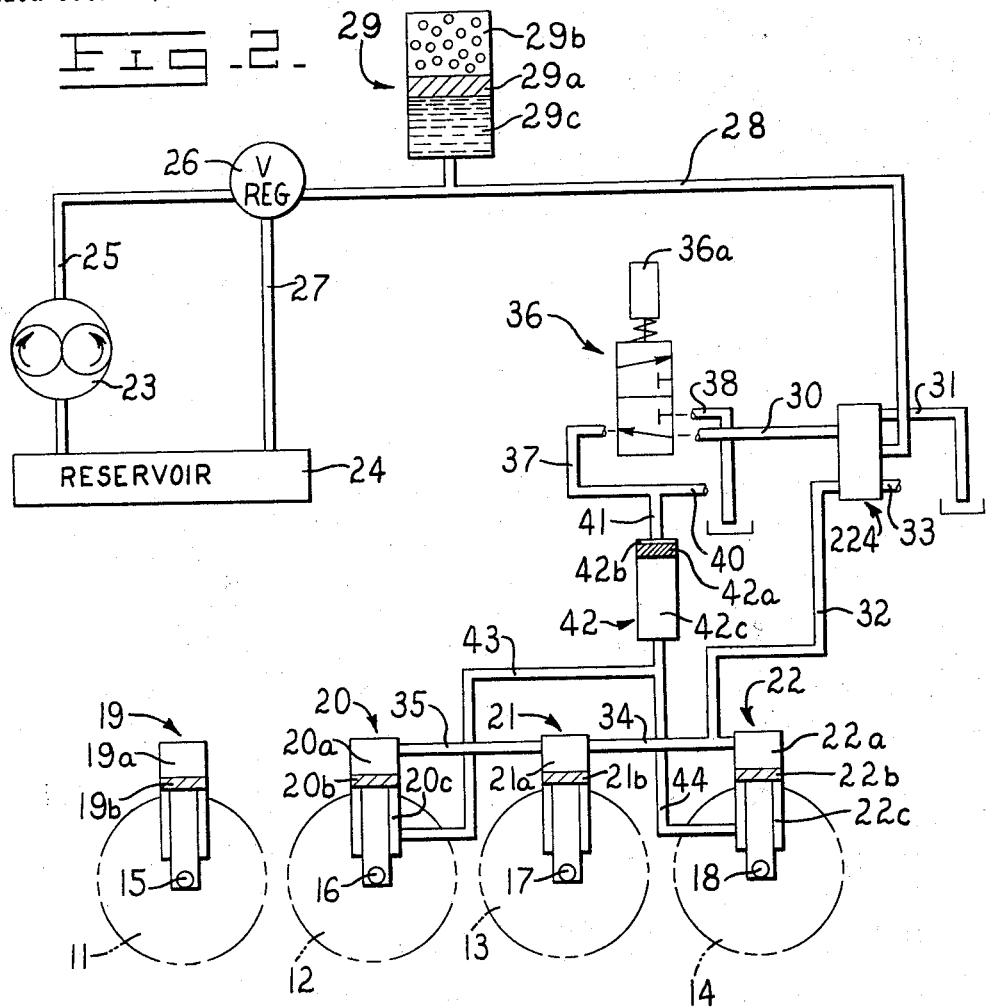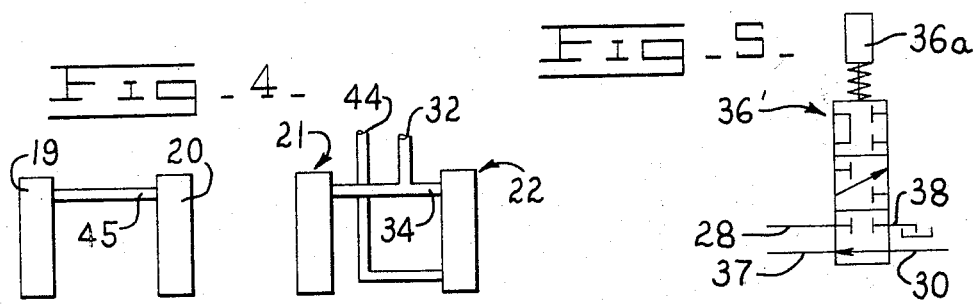

United States Patent Office
3,441,102
Patented Apr. 29, 1969

3,441,102
LOAD TRANSFERRING SYSTEM FOR MULTI-AXLE VEHICLES
Ralph H. Kress, Peoria, Ill., assignor to Caterpillar Tractor Co., Peoria, Ill., a corporation of California
Filed Oct. 26, 1966, Ser. No. 589,627
Int. Cl. B62d 61/10, 37/00
U.S. Cl. 180—22          14 Claims

ABSTRACT OF THE DISCLOSURE

A load transferring system for multi-axle vehicles comprises a hydraulic control system for automatically transferring a large portion of a vehicle's gross weight to the driven wheels thereof when the vehicle is empty or partially loaded. The control system comprises suspension means for at least one non-driven wheel and means for automatically raising such wheel when the fluid pressure in a chamber of the suspension means drops below a predetermined level.

---

Multi-axle vehicles are oftentimes difficult to operate due to the limited traction afforded by the driven, ground-engaging wheels thereof. This problem is particularly apparent when the vehicle, such as an earthloading truck, is maintained in an unloaded or partially loaded condition and operated over wet or muddy ground, for example. Various prior art control means have been developed for manually or automatically raising ground-engaging vehicle wheels to transfer a large portion of the vehicle's gross weight to the driven wheels thereof to increase vehicle traction. A number of such control systems comprise a plurality of bellow or similar type devices which do not continually afford an accurate load transferring function. In addition, many prior art systems are constructed and arranged in a complex manner and are expensive to manufacture and service.

This invention is drawn to an improved load transferring system which may be readily adapted for use in conventional multi-axle vehicles. The system essentially comprises control means for automatically moving a vehicle's wheel away from the ground when the pressure in a fluid retaining chamber, cooperating with a piston of a suspension system for such wheel, drops below a predetermined level. Such movement will function to automatically shift a greater amount of the vehicle's gross weight onto the driven wheels thereof for increased traction purposes. Conversely, when such driven wheel engages the ground with increased pressure, as dictated by increased vehicle loading, the system will automatically function to move the controlled wheel into ground-engaging position to aid the other vehicle wheels in supporting the gross weight of the vehicle.

An object of this invention is to provide a noncomplex and inexpensive load transferring system for multiaxle vehicles comprising a single suspension device comprising a piston operatively connected to at least one of a plurality of ground-engaging wheels and control means operatively associated with a pressure sensing chamber cooperating with such piston for transferring a large portion of a vehicle's gross weight to the driven wheels thereof when the vehicle is empty or partially loaded.

Another object of this invention is to provide a load transferring system for multi-axle vehicles comprising at least three ground-engaging wheels arranged in series on a side of a vehicle and control means for automatically raising at least one of the outer wheels relative to the middle, driven wheel when the ground-engaging pressures of the outer wheels fall below a predetermined level.

Further and more specific objects of this invention will become apparent from the following description and accompanying drawings wherein:

FIG. 1 is a side elevational view of an earth-loading vehicle employing the load transferring ssytem of this invention;

FIG. 2 is a view schematically illustrating the load transferring system employed in the vehicle illustrated in FIG. 1;

FIG. 3 is a cross-sectional view of a control valve employed in the load transferring system illustrated in FIG. 2;

FIG. 4 schematically illustrates a modification of the system shown in FIG. 2; and FIG. 5 illustrates a modified override valve means.

FIG. 1 illustrates an earth-loading vehicle 10, preferably a truck, having the body portion thereof supported by ground-engaging wheels 11–14 arranged in series. It should be understood that a like number of wheels are positioned in a similar manner on the opposite side of the vehicle and may be operatively connected to the first-mentioned wheels via transverse axles 15–18. It should be understood that each wheel may be suspended individually in the manner disclosed in U.S. patent application Serial No. 488,986 and since issued as Patent No. 3,341,220 or U.S. patent application Serial No. 567,185, both assigned to the assignee of this application. The pair of wheels 13 (one shown) are preferably driven by the vehicle's engine via a drive axle 17 whereas the remaining wheels may be rotatably mounted on "dead" axles 15, 16 and 18. The truck's gross weight is preferably evenly distributed over the axles so that each axle supports approximately one-fourth thereof, i.e. the truck's center of gravity G is located approximately midway between axles 16 and 17.

Conventional air-oil suspension devices 19–22 are operatively associated with axles 15–18, respectively, to support the vehicle's body portion on the axles in a conventional manner. Suspension device 19, for example, comprises a closed chamber 19a precharged with a compressible fluid at a selected pressure and a reciprocable piston 19b operatively connected to axle 15. The fluid preferably constitutes a compressible gas, such as nitrogen. Chambers 19a–22a will be hereinafter referred to as "shock absorbing" chambers whereas chambers 20c and 22c will be referred to as "lifting" chambers.

Referring to FIG. 2, schematically illustrating a preferred embodiment of the load transferring ssytem of this invention, a positive displacement pump 23 may be operatively connected to the vehicle's engine to pump fluid from a reservoir 24 through a conduit 25. The pressurized fluid then flows through a constant pressure outlet valve 26 arranged to relieve excess fluid pressure to reservoir 24 via a conduit 27. Fluid maintained at such constant pressure is communicated to a conduit 28 having a conventional air-over-oil accumulator 29 operatively connected thereto.

The accumulator functions in a conventional manner to accumulate hydraulic fluid for the controlled operation of suspension devices 20 and 22, as will be hereinafter more fully explained. The accumulator comprises a floating piston 29a arranged to separate the accumulator's housing into a closed gas retaining chamber 29b and a chamber 29c arranged to receive the fluid contained in conduit 28. Conduit 28 further communicates with a control valve means or pressure modulating valve 224 which is substantially disclosed in United States Patent No. 3,250,526 to Ralph H. Kress for "Vehicle Suspension Device." Corresponding numerals appearing in this application and such patent depict similar structures.

In particular, control valve 224 (FIG. 3) comprises a housing section 226 having an elongated bore 228 formed therein reciprocably mounting a valve spool 230. A cap section 232 is attached to the upper end of the housing and has an adjustment screw 234 threadably mounted therein. As illustrated, the screw is arranged to abut a floating piston member 236 mounted in a bore 238 formed in section 232. A spring 240 is arranged to abut a freefloating flange member 244 and piston 236 to urge the piston upwardly against the end of screw 234. Spool 230 has a stem portion 242 formed thereon and arranged to extend into an aperture formed in flange member 244. It can be seen that the magnitude of the bias afforded by spring 240 and thus the extent of upward movement of spool 230 may be regulated selectively by adjusting screw 234.

The lower end of the housing comprises a section 246 having bores 248 and 250 formed therein and arranged to slidably mount pistons 252 and 254, respectively. Each piston is provided with an O-ring seal 256 which functions to prevent fluid passage thereby. As will be hereinafter more fully explained, pressurized gas, such as nitroggens, is communicted to bore 248 via a passage 258 for selectively urging piston 252 and thus spool 230 upwardly. Likewise, a passage 262 is arranged to communicate the pressurized gas to bore 250 to urge piston 254 and thus spool 230 upwardly. A sealed plug 260 is preferably pressfitted into the lower end of bore 248 to prevent communication between bores 248 and 250. An end cap 264 is suitably attached to the lower end of the housing to seal off the above-described passages and bores.

When spool 230 is positioned as viewed in FIG. 3, pressurized fluid will be communicated from conduit 28 to a conduit 30 for purposes of conditioning the system for the retraction of wheels 12 and 14 relative to wheel 13 (FIG. 2). Such retraction is responsive to a drop in gas pressure in bore 248 below a predetermined level. Such gas pressure is directly responsive to the pressure existing between ground-engaging wheels 12 and 14 and the ground, i.e. responsive to variations of the gross weight of the vehicle.

Conversely, when valve spool 230 is moved upwardly in response to an increase in gas pressure in bore 248 above such predetermined level, pressurized fluid from conduit 28 will not be permitted to communicate with conduit 30 due to the closing arrangement afforded by land 268 between conduits 28 and 30. During the latter condition of operation, fluid will be communicated from conduit 30 to a drain conduit 31 (FIG. 2), arranged to communicate with a drain which may be common to reservoir 24. The above mentioned gas pressure is communicated to bores 248 and 250 via conduits 32 and 33, respectively.

Whereas conduit 32 is arranged to communicate with shock absorbing chambers 20a–22a of suspension devices 20–22, respectively, conduit 33 is arranged to communicate with corresponding suspension devices (not shown) arranged on the side of the vehicle opposite to the side illustrated in FIG. 1. As further schematically illustrated in FIG. 2, conduits 34 and 35 are preferably arranged to intercommunicate chambers 20a–22a. It should be noted that the level of gas pressure prevalent in chambers 20a–22a may be varied selectively by control means (not shown) or set at a precharged level when the illustrated closed system is manufactured. Gas, of course, constitutes the preferred medium utilized in shock absorbing chambers 19a–22a since it will compress within a predetermined range of pressure levels to achieve the desired suspension and cushioning functions.

Conduit 30 further communicates with a manually controlled override valve means 36 comprising a conventional detent mechanism 36a arranged thereon for selectively blocking communication between conduit 30 and a conduit 37. Such movement will further function to communicate conduit 37 with a drain conduit 38 arranged to relieve fluid from conduit 37 to a reservoir which may be common with reservoir 24. Conduit 37 in turn communicates with conduits 40 and 41, each arranged to communicate with a fluid pressure transferring means 42 (one shown).

The pressure transferring means communicating with conduit 40 would, of course, be positioned on the side of the vehicle opposite to the side illustrated in FIG. 1. The pressure transferring means comprises a free-floating piston 42a arranged to form chambers 42b and 42c within the housing thereof. Increased fluid pressure in chamber 42b will function to move piston 42a downwardly to increase fluid pressure in chamber 42c and thus lifting chambers 20c and 22c of suspension devices 20 and 22 via conduits 43 and 44, respectively.

In normal operation and with the vehicle unloaded or partially loaded, pump 23 functions to communicate fluid at approximately 2,000 p.s.i., for example, under the control of accumulator 29 to pressure transferring means 42 in the manner illustrated in FIG. 2. Wheels 12–14 will realize low ground-engaging pressures due to such partial loading to effect a low, predetermined pressure level in shock absorbing chambers 20a–22a. Such a low pressure level will be insufficient to move spool 230 (FIG. 3) upwardly to a closed position whereby communication between conduits 28 and 30 is cut off by land 268. Rather, a drop below such pressure level will function to freely communicate input conduit 28 with pressure transferring means 42 via conduits 30, 37 and 41.

Increased fluid pressure in chamber 42b will function to increase the fluid pressure maintained in sealed lifting chambers 20c and 22c to raise pistons 20b and 22b, respectively. Thus, axles 16 and 18 will also move upwardly relative to drive axles 15 and 17 to transfer a greater portion of the vehicle's gross weight to wheels 11 and 13. As above mentioned, such gross weight is preferably evenly distributed over axles 15–18 during normal operations wherein the vehicle is loaded to substantially full capacity. Thus, when axles 16 and 18 are raised, either fully or partially off the ground, drive axle 17 will assume approximately fifty percent (rather than a normal twenty-five percent) of the vehicle's weight to increase road traction. In addition, the raising of wheels 12 and 14 reduces tire wear and rolling resistance encountered by the vehicle.

It should be noted that during such a weight transferring function the pressure in shock absorbing chambers 20a and 22a will gradually increase to move pistons 252 and 254 upwardly in FIG. 3 to thus constantly modulate fluid pressure past land 268 of valve spool 230. Also, increased gas pressure in such chambers will be communicated to shock absorbing chamber 21a resulting in a slight tendency for piston 21b to move downwardly to further increase the traction of wheel 13.

It should be understood that various modifications may be made to the above-disclosed system without departing from the spirit of this invention. For example, as schematically illustrated in FIG. 4, conduits 35 and 43 could be eliminated from the FIG. 2 system and a conduit 45 added to communicate shock asborbing chambers 19a and 20a to form a closed gas retaining system therebetween. Such a modified system would function to raise only wheel 14 above the ground for weight transferring purposes. In addition, the system could be reversed structurally and functionally by one skilled in the art so that driven wheel 13 would be moved downwardly automatically to increase road traction when the vehicle is unloaded or partially loaded, i.e., in contrast to moving wheel 12 and/or 14 upwardly relative to wheel 13 in the aforedescribed manner. Also, a further modification could be one wherein conduits 34 and 35 are eliminated and only shock absorbing chamber 21a is arranged to communicate directly with conduit 32 to afford the "sensing" function whereby wheels 12 and 14 would raise in response to a partial loading of the vehicle.

FIG. 5 illustrates a three-position override valve means 36' constituting a modification of above-described two-position valve means 36. In the first position shown, valve means 36' allows the load transferring function to be carried forth automatically in a manner similar to that described in connection with FIG. 2. When the valve means is actuated and held in a second position by detent mechanism 36a, it can be seen that conduit 37 will communicate with drain conduit 38 and the fluid input from conduit 30 will be blocked. Further actuation of valve 36' to its third position (or second detent position) will function to communicate conduits 28 and 37 directly. The vehicle's operator could utilizer such a third position when he desires to bypass control valve 224 to increase vehicle traction directly.

What is claimed is:

1. A vehicle comprising a body portion, at least one driven and one non-driven ground-engaging wheel arranged in tandem on at least one side of said vehicle, a suspension arrangement operatively supporting said body portion on each of said wheels, said suspension arrangement including a first suspension means for said non-driven wheel comprising a piston and cylinder assembly operatively connected to said non-driven wheel and body portion respectively to reciprocate relative to each other in response to vertical movements of such wheel, said piston and cylinder assembly forming a shock absorbing and lifting means in which said cylinder includes an expansible chamber having a fluid retained therein at a predetermined pressure level, said suspension arrangement including a further suspension means between said body and said driven ground engaging wheel and control means operatively associated with said chamber and directly responsive to pressure variations occurring therein for automatically raising said non-driven wheel vertically relative to said driven wheel when fluid pressure in said chamber drops below said predetermined level whereby said driven wheel will assume a greater portion of the weight of said body portion to improve the traction thereof.

2. The invention of claim 1 wherein at least three of said wheels are arranged in series on a side of said vehicle, the middle wheel constituting said driven wheel and the two outer wheels constituting non-driven wheels.

3. The invention of claim 1 wherein said expansible cylinder further comprises a lifting chamber and a shock absorbing chamber separated by said piston and each said last named chambers being operatively associated with said control means for being pressurized to automatically raise said non-driven wheel when the fluid pressure in said shock absorbing chamber drops below said predetermined level.

4. The invention of claim 3 wherein said control means comprises a control valve means operatively associated with said shock absorbing chamber for modulating fluid flow from a pressurized fluid source to said lifting chamber in response to the pressure level maintained in said shock absorbing chamber.

5. The invention of claim 4 wherein said control means further comprises a pressure transferring means having a free-floating piston arranged therein to form a chamber on each side thereof, one such chamber communicating with said control valve means and the other such chamber communicating with said lifting chamber.

6. The invention of claim 4 further comprising an override valve means for selectively bypassing said control valve means to communicate said pressurized fluid source and said lifting chamber directly.

7. The invention of claim 3 wherein said further suspension means comprises a shock absorbing chamber arranged to communicate with the shock absorbing chamber of said first suspension means so that increased fluid pressure in the lifting chamber of said first suspension means will function to increase fluid pressure in the shock absorbing chamber thereof and also the shock absorbing chamber of said further suspension means to further increase traction of said driven wheel.

8. The invention of claim 7 further comprising a second non-driven wheel arranged so that said driven wheel is positioned in series between said non-driven wheels, a third suspension means operatively connected to said second non-driven wheel comprising a shock absorbing chamber arranged to communicate with the shock absorbing chambers of said first and further suspension means and a lifting chamber arranged to communicate with the lifting chamber of said first suspension means.

9. The invention of claim 7 further comprising second and third non-driven wheels arranged in series with said first non-driven wheel and said driven wheel and third and fourth suspension means operatively connected to each of said second and third non-driven wheels, respectively, each comprising a shock absorbing chamber, the shock absorbing chambers of said third and fourth suspension means arranged to communicate with each other.

10. The invention of claim 3 wherein said control means further comprises an override valve means arranged therein for selectively preventing pressurization of said lifting chamber.

11. In a vehicle, the combination comprising a body portion arranged to be supported by at least one driven and one non-driven wheel arranged on at least one side of said vehicle, first and second suspension means operatively connected between said body portion and said non-driven and driven wheels, respectively, each suspension means comprising a reciprocably mounted piston arranged therein to form a shock absorbing chamber means having a fluid retained therein at a predetermined pressure level for cushioning vertical movements of the wheel connected therewith, the piston of said first suspension means further arranged to form a lifting chamber therein and control means, including a pressurized fluid source functioning independently of said second suspension means, operatively associated with at least one of said shock absorbing chambers and said lifting chamber for automatically pressurizing said lifting chamber by said pressurized fluid source to raise said non-driven wheel vertically relative to said driven wheel when fluid pressure in said last-mentioned shock absorbing chamber drops below said predetermined pressure level.

12. The invention of claim 11 wherein said control means comprises a pressure modulating valve.

13. A vehicle comprising a body portion, at least two ground engaging wheels arranged in tandem on at least one side of said vehicle, a suspension arrangement operatively supporting said body portion on each of said wheels, said suspension arrangement including a first suspension means comprising a piston and cylinder assembly forming separated and expansible fluid retaining shock absorbing and lifting chambers and operatively connected to a first one of said wheels and said body portion respectively to reciprocate relative to each other in response to vertical movements of said one wheel and further including a second suspension means comprising a piston and cylinder assembly forming a shock absorbing chamber and operatively connected to a second one of said wheels and said body portion respectively to reciprocate relative to each other in response to vertical movements of said second wheel and control means operatively associated with the lifting chamber of said first suspension means for selectively increasing the fluid pressure level therein to move said first wheel vertically relative to said second wheel, said control means including means communicating the shock absorbing chambers of said first and second suspension means whereby the fluid pressure level in said shock absorbing chambers will increase in response to pressurization of said lifting chamber to urge said second wheel in a vertical direction opposite to the vertical movement of said first wheel.

14. The invention of claim 13 wherein said control means further comprises fluid pressure transferring means for selectively increasing fluid pressure in the lifting chamber of said first suspension means, said fluid pressure transferring means including a free floating piston forming separated first and second chambers, said first chamber communicating with a pressurized fluid source and said second chamber communicating with said lifting chamber.

References Cited

UNITED STATES PATENTS 3,053,335    9/1962    Gnade et al.
3,094,341    6/1963    Alfieri.
3,366,399    1/1968    Hunger.

A. HARRY LEVY, *Primary Examiner.*

U.S. Cl. X.R.

280—104.5